(12) United States Patent  
Valsecchi

(10) Patent No.: US 9,138,105 B2  
(45) Date of Patent: Sep. 22, 2015

(54) SUPPORT TO BE RIVETED FOR A HANDLE

(75) Inventor: Ercole Valsecchi, Valmadrera (IT)

(73) Assignee: SANMIRO S.R.L., Cesana Brianza (LC) (IT)

( * ) Notice: Subject to any disclaimer, the term of this patent is extended or adjusted under 35 U.S.C. 154(b) by 891 days.

(21) Appl. No.: 12/866,278

(22) PCT Filed: Feb. 4, 2009

(86) PCT No.: PCT/EP2009/051231  
§ 371 (c)(1),  
(2), (4) Date: Aug. 5, 2010

(87) PCT Pub. No.: WO2009/098214  
PCT Pub. Date: Aug. 13, 2009

(65) Prior Publication Data  
US 2011/0013977 A1 Jan. 20, 2011

(30) Foreign Application Priority Data  
Feb. 6, 2008 (IT) .............................. MI20080050 U

(51) Int. Cl.  
*F16B 7/00* (2006.01)  
*A47J 45/06* (2006.01)

(52) U.S. Cl.  
CPC .......... *A47J 45/061* (2013.01); *Y10T 403/3921* (2015.01)

(58) Field of Classification Search  
CPC ......................... A47J 45/061; Y10T 403/3921  
USPC ............. 403/190, 274; D7/393–395; 220/776  
See application file for complete search history.

(56) References Cited

U.S. PATENT DOCUMENTS

| 1,483,000 | A | | 2/1924 | Kruesheld |
| 2,494,159 | A | * | 1/1950 | Bernstein ..................... 220/759 |
| 2,664,235 | A | * | 12/1953 | Champlin et al. ............ 206/198 |
| D571,148 | S | * | 6/2008 | Munari ........................... D7/393 |
| D580,219 | S | * | 11/2008 | Munari ........................... D7/393 |
| 7,841,486 | B2 | * | 11/2010 | Munari ........................ 220/776 |
| 2007/0201944 | A1 | * | 8/2007 | Munari ...................... 403/109.1 |

FOREIGN PATENT DOCUMENTS

EP 1747746 1/2007

* cited by examiner

*Primary Examiner* — Victor MacArthur  
(74) *Attorney, Agent, or Firm* — Birch, Stewart, Kolasch & Birch, LLP

(57) ABSTRACT

What is described is a support to be fixed to flying pans and the like, comprising a thin curved element (3) configured so as to irremovably embrace a connecting protuberance (13) of a handle (14). On the outer surface (50) of said element (3) two pairs of lateral incisions (10) are provided which define lateral portions (11) of the curved element (3) to be force fit into lateral grooves (12) of the connecting protuberance (13).

8 Claims, 4 Drawing Sheets

SUPPORT TO BE RIVETED FOR A HANDLE

The present invention relates to a support to be riveted for a handle.

It is known that in order to connect a handle, made for example of bakelite, to a concave frame suitable for containing products to be cooked, a support is necessary.

Said support usually consists of a thin curved element, almost closed, which is forced to close around a terminal protuberance of the handle designed precisely for this purpose.

Said protuberance is normally flat and is forcibly embraced by the curved element of the support. To better fix the support to the handle, a point on the bottom surface of the support is forced under pressure.

Said support further comprises perforated flaps to be riveted to the frame, thereby completing the frying pan or pot.

This type of support has a drawback in that after a certain period of time the curved element tends to come loose and the handle thus starts to wobble relative to the pan frame, which is securely fixed to the support to be riveted.

A more effective solution is one in which the ends of the curved element terminal flap portions configured so as to forcibly engage a thin slit fashioned in the protuberance of the handle. Assembly is much more difficult and the efficiency of the connection in any case declines rapidly over time. It should be borne in mind that pots are used at high temperatures.

The object of the present invention is to provide a support to be riveted for pots and the like which overcomes the above-described drawbacks and which guarantees, in particular, the absence of relative movements between the handle and support for a long time.

According to the invention, this object is achieved with a support to be fixed to frying pans and the like which comprises a thin curved element configured so as to irremovably embrace the connecting protuberance of a handle, characterised in that it comprises, on the outer surface of said element, two pairs of lateral incisions defining lateral portions of the curved element to be force fitted into lateral grooves of the connecting protuberance.

These and other characteristics of the present invention will become more apparent from the following detailed description of a practical embodiment thereof, illustrated solely by way of non-restrictive example in the appended drawings, in which.

Figure 1:
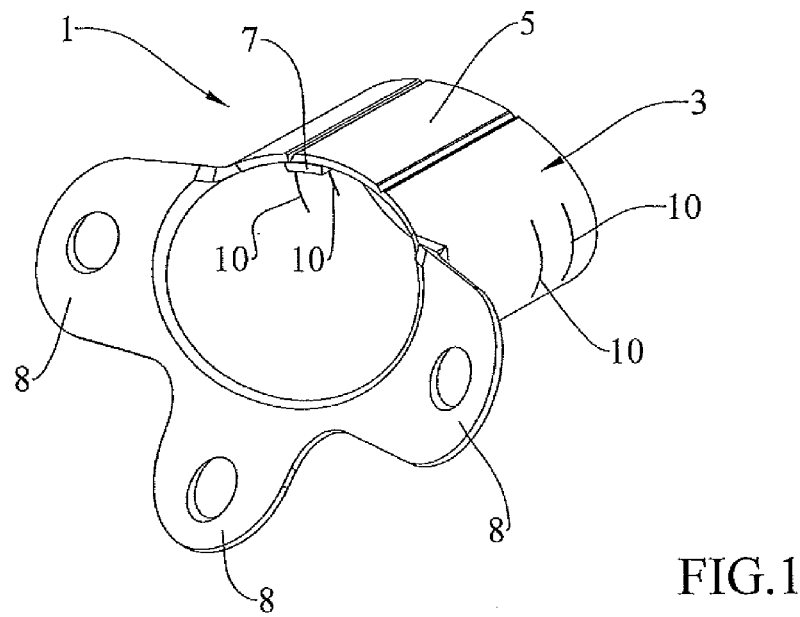
FIG. 1 shows a perspective view of the support according to the invention.
Figure 2:
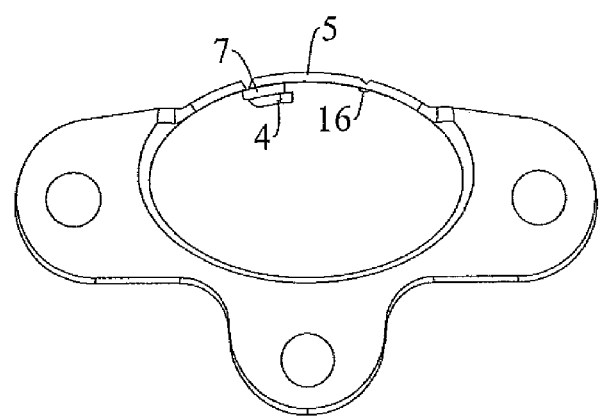
FIG. 2 shows a front view of the support.
Figure 3:
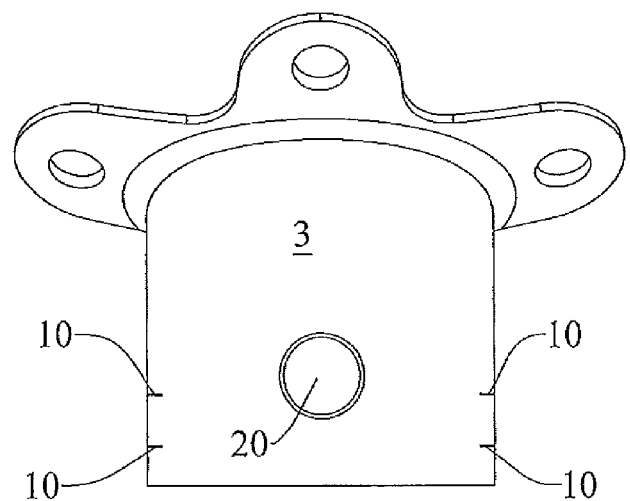
FIG. 3 shows a layout view of the support from below.
Figure 4:
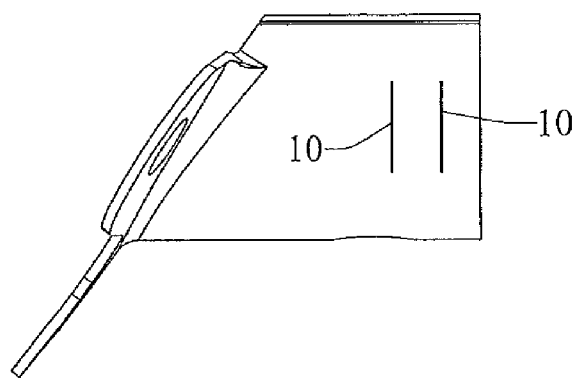
FIG. 4 shows a side view of the support.
Figure 5:
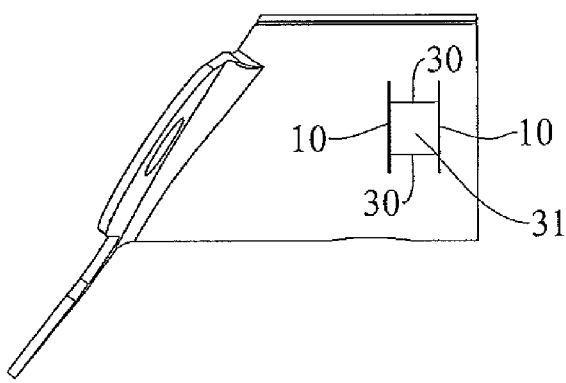
FIG. 5 shows a side view of a second embodiment of the support.
Figure 6:
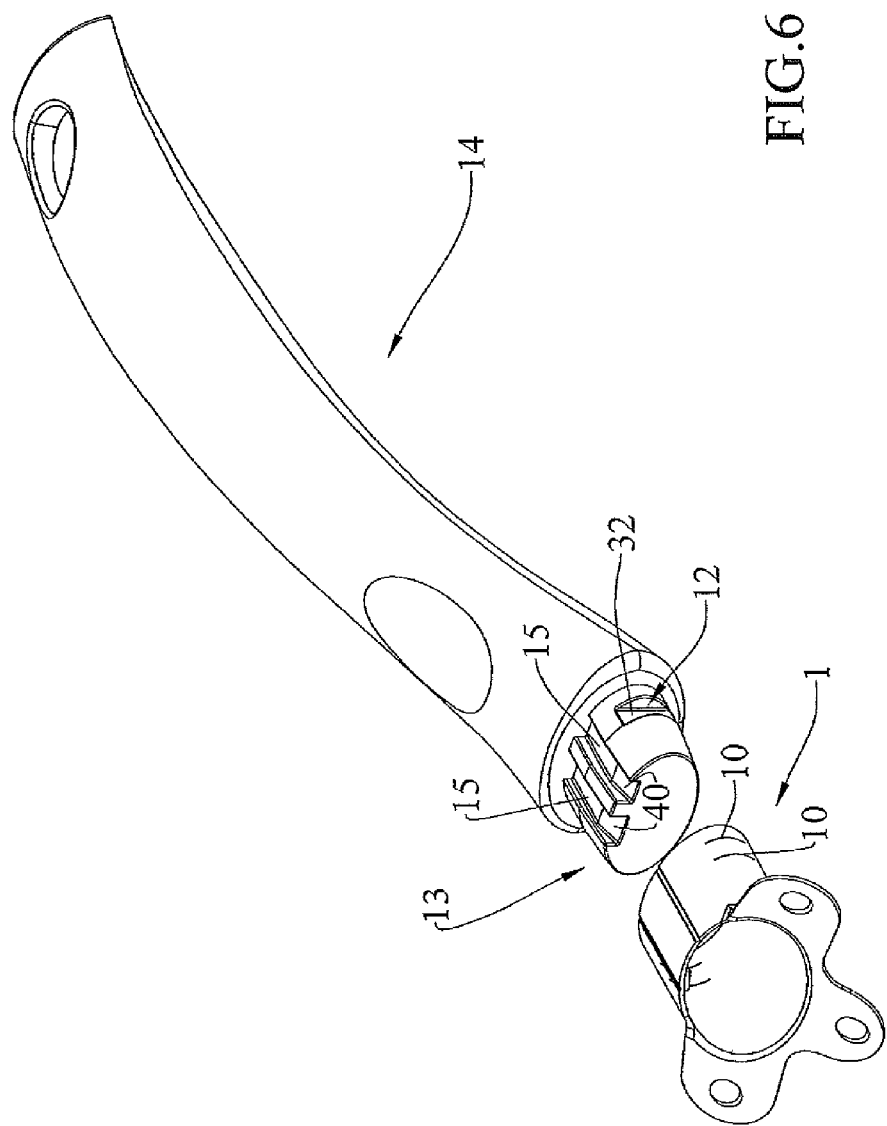
FIG. 6 shows a perspective view of the support and handle prior to assembly.
Figure 7:
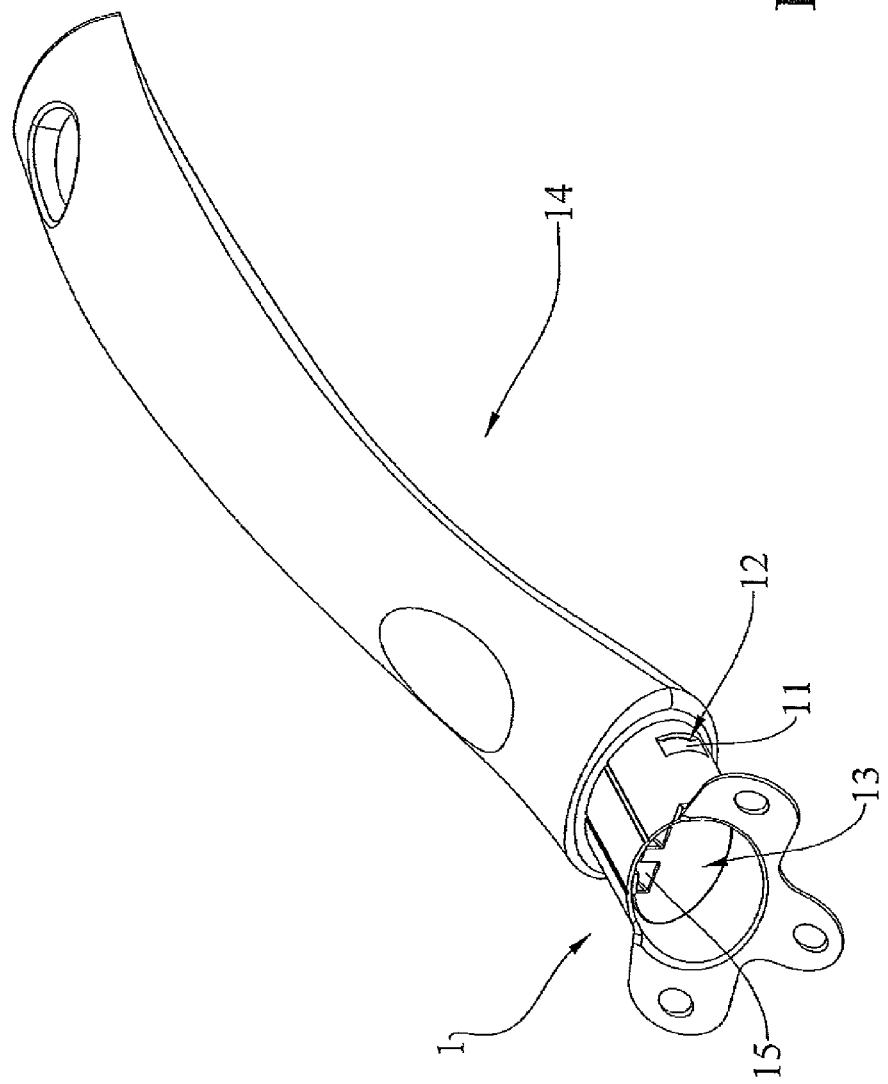
FIG. 7 shows a perspective view of the support and handle assembled together.

FIGS. 1-4 illustrate a support 1 designed to be riveted to a frying pan 2, consisting of a thin, curved, substantially oval element 3 closed by means of a tooth 4 of a top portion 5 of said body 3, which engages a slit 6 of a lowered flat flap 7 likewise of said body 3, and perforated flaps 8 to be riveted.

The support 1 additionally has two pairs of lateral incisions 10 defining lateral portions 11 to be force fitted, by applying pressure, into lateral grooves 12 of the connecting protuberance 13 of a pot handle 14. To facilitate the force-fitting operation two further incisions 30 may be fashioned at right angles to the previous ones so as to form a central portion 31 that will come to rest against a resting surface 32 of the lateral grooves 12.

Said connecting element 13 also has two upper grooves 15 with slanted guides 40, suitable for receiving the coupling tooth 4 and a rib 16 delimiting the top surface portion 5; the groove 15 intended to receive the tooth 4, being wider and deeper.

Said rib 16 permits the forced rotation of the portion 5 to facilitate engagement of the tooth 4 in the slit 6. As a result, residual stresses are limited and the support 1 is easier to prepare for assembly. Furthermore, the closure of the curved element (3) is standardised to a greater degree, thus improving repeatability and assuring a secure anchorage of the coupling to the connecting element 13.

The upper grooves 15 serve as guides for the support during the assembly phase.

Fixing is achieved after correct positioning, by forcing the lateral surfaces 12 and pressing in a point 20 on the bottom surface of the support.

The lateral fixings lend greater balance to the connection, thus increasing the effectiveness thereof over time.

Bending strength tests conducted as per applicable standards have demonstrated that breakage occurs well beyond the minimum vertical force threshold of 100 N, and it occurs in the bakelite handle; the support 1 remains securely fixed to the connecting element 13 of the handle 14. Breakage normally occurs just beyond the threshold, and in the support 1, which testifies to the critical nature of this component.

The invention claimed is:

1. A support to be fixed to a pan, the support comprising:
an element having a sidewall with an inner surface and an outer surface;
a first pair of longitudinal incisions formed in the outer surface of the element; and
a second pair of lateral incisions extending between the first pair of longitudinal incisions to form a first central portion,
wherein the first central portion is moveable inwardly;
a third pair of longitudinal incisions formed in the outer surface of the element, the third pair of longitudinal incisions diametrically opposed to the first pair of longitudinal incisions; and
a fourth pair of lateral incisions extending between the third pair of longitudinal incisions to form a second central portion.

2. The support of claim 1, wherein the first pair of longitudinal incisions is vertically oriented.

3. The support of claim 1, wherein each of the first pair of longitudinal incisions has a first end and a second end, the second pair of lateral incisions being spaced from the ends of the first pair of longitudinal incisions.

4. The support of claim 1, further comprising:
a handle, the handle having a first pair of grooves,
wherein the central portions extend inwardly and engage the grooves to secure the element to the handle.

5. The support of claim 4, further comprising:
a rib and a tooth extending from the inner surface of the element; and
a second pair of grooves in the handle,
wherein the tooth and rib engage the second pair of grooves.

6. The support of claim 1, wherein the first pair of longitudinal incisions is a first longitudinal incision and second longitudinal incision which are parallel to one another.

7. The support of claim 1, wherein the second pair of lateral incisions is a first lateral incision and second lateral incision which are parallel to one another.

8. The support of claim 1, further comprising: perforated flaps extending outwardly from the element.

* * * * *